United States Patent
Fujita et al.

(10) Patent No.: US 11,239,766 B2
(45) Date of Patent: Feb. 1, 2022

(54) FLYING CAPACITOR CIRCUIT, CIRCUIT MODULE AND POWER CONVERSION APPARATUS

(71) Applicant: FUJI ELECTRIC CO., LTD., Kanagawa (JP)

(72) Inventors: Satoru Fujita, Tachikawa (JP); Yuto Matsui, Hino (JP); Yusuke Onishi, Hino (JP)

(73) Assignee: FUJI ELECTRIC CO., LTD., Kanagawa (JP)

( * ) Notice: Subject to any disclaimer, the term of this patent is extended or adjusted under 35 U.S.C. 154(b) by 31 days.

(21) Appl. No.: 16/801,028

(22) Filed: Feb. 25, 2020

(65) Prior Publication Data
US 2021/0013814 A1 Jan. 14, 2021

(30) Foreign Application Priority Data
Jul. 11, 2019 (JP) .............................. JP2019-128958

(51) Int. Cl.
*H02M 7/483* (2007.01)
*H01G 4/40* (2006.01)
*H02M 7/00* (2006.01)

(52) U.S. Cl.
CPC ............ *H02M 7/4837* (2021.05); *H01G 4/40* (2013.01); *H02M 7/003* (2013.01); *H02M 7/483* (2013.01)

(58) Field of Classification Search
CPC ............... H02M 7/4837; H02M 7/003; H02M 2001/007; H02M 3/07; H02M 3/003; H01G 4/40

See application file for complete search history.

(56) References Cited

U.S. PATENT DOCUMENTS

| | | | | |
|---|---|---|---|---|
| 9,024,478 B2 * | 5/2015 | Cooley | .................... | H02J 3/385 307/82 |
| 10,778,098 B2 * | 9/2020 | Yang | .................... | H02M 7/4837 |
| 10,848,070 B2 * | 11/2020 | Li | ...................... | H02M 3/33569 |
| 2013/0094157 A1 * | 4/2013 | Giuliano | ................. | H01L 28/90 361/748 |
| 2014/0126263 A1 * | 5/2014 | Koyano | ................ | H02M 7/003 363/148 |
| 2014/0177292 A1 * | 6/2014 | Woodford | ............. | H02M 7/483 363/35 |
| 2016/0064160 A1 * | 3/2016 | Lemmen | ............... | H02M 3/158 363/123 |
| 2016/0261178 A1 * | 9/2016 | Sato | ......................... | H02M 1/08 |
| 2018/0048255 A1 * | 2/2018 | Marvin | ................... | H02P 27/14 |
| 2020/0195147 A1 * | 6/2020 | Okagawa | .............. | H02M 3/158 |
| 2020/0321874 A1 * | 10/2020 | Fujita | .................. | H02M 7/4837 |

FOREIGN PATENT DOCUMENTS

JP 6128924 B2 5/2017
WO 2015037537 A1 3/2015

* cited by examiner

*Primary Examiner* — Alex Torres-Rivera

(57) ABSTRACT

If current path is switched via switching, voltage overshoot exceeding the device breakdown voltage may be generated. A flying capacitor circuit is provided, having a plurality of switching devices cascade-connected on a first surface of a substrate; a plurality of rectifier devices cascade-connected on a second surface of the substrate; and at least one capacitor provided in a wiring connecting main terminals of a switching device and a rectifier device that are associated with each other and included in the plurality of switching devices and the plurality of rectifier devices; and at least part of the wiring runs sandwiching the substrate in parallel.

23 Claims, 15 Drawing Sheets

| DEVICE \ Number of Switching | | Vin/2 | (N-2)·Vin/2N | (N-4)·Vin/2N | (N-6)·Vin/2N | ... | -Vin/2 |
|---|---|---|---|---|---|---|---|
| DEVICE 21 | 1 | ○ | — | — | — | ⋮ | — |
| | 2 | ○ | ○ | — | — | ⋮ | — |
| | 3 | ○ | ○ | ○ | — | ⋮ | — |
| | ... | ○ | ○ | ○ | ○ | ⋮ | — |
| | N | ○ | ○ | ○ | ○ | ⋮ | — |
| DEVICE 22 | 1 | — | ○ | ○ | ○ | ⋮ | ○ |
| | 2 | — | — | ○ | ○ | ⋮ | ○ |
| | 3 | — | — | — | ○ | ⋮ | ○ |
| | ... | — | — | — | — | ⋮ | ○ |
| | N | — | — | — | — | ⋮ | ○ |

※ ○ : ON, — : OFF

FLYING CAPACITOR CIRCUIT, CIRCUIT MODULE AND POWER CONVERSION APPARATUS

The contents of the following Japanese patent application(s) are incorporated herein by reference: 2019-128958 filed in JP on Jul. 11, 2019

BACKGROUND

1. Technical Field

The present invention relates to a flying capacitor circuit, circuit module and power conversion apparatus.

2. Related Art

Conventionally, in a flying capacitor circuit, current flowing in a current path provided with a flying capacitor is switched via switching (for example, see Patent Document 1).

Patent Document 1 International Publication No. 2015/037537

However, if the current path is switched via switching, voltage overshoot exceeding the device breakdown voltage may be generated.

SUMMARY

In the first aspect of the present invention, a flying capacitor circuit is provided to solve the above-mentioned problem. The flying capacitor circuit may include a plurality of switching devices cascade-connected on a first surface of a substrate. The flying capacitor circuit may include a plurality of rectifier devices cascade-connected on a second surface of the substrate. The flying capacitor circuit may include at least one capacitor provided in a wiring connecting main terminals of a switching device and a rectifier device that are associated with each other and included in the plurality of switching devices and the plurality of rectifier devices. At least part of the wiring may run sandwiching the substrate in parallel.

The plurality of switching devices may be cascade-connected in a straight line and the plurality of rectifier devices may be cascade-connected in a straight line parallel to the line in which the plurality of switching devices are cascade-connected.

The plurality of switching devices may be cascade-connected along a straight line and the plurality of rectifier devices may be cascade-connected in a straight line which is the same straight line in a planar view as the line in which the plurality of switching devices are cascade-connected.

In the flying capacitor circuit, at least one capacitor may be included in each of a plurality of wirings except a wiring for connecting a main terminal of the plurality of cascade-connected switching devices which is the closest to one end and a main terminal of the plurality of cascade-connected rectifier devices which is the closest to the one end, the wirings each connecting a switching device and a rectifier device that are associated with each other and included in the plurality of switching devices and the plurality of rectifier devices.

The number of capacitors provided between main terminals of a switching device and a rectifier device of one set associated with each other may be different from the number of capacitors provided between main terminals of a switching device and a rectifier device of another set, where the switching device and the rectifier device of the one set and the switching device and the rectifier device of the other set are included in the plurality of switching devices and the plurality of rectifier devices.

The number of capacitors provided between main terminals of a switching device and a rectifier device on an input terminal side of the flying capacitor may be different from the number of capacitors provided between main terminals of a switching device and a rectifier device on an output terminal side of the flying capacitor circuit, where the switching device and the rectifier device on the input terminal side and the switching device and the rectifier device on the output terminal side are included in the plurality of switching devices and the plurality of rectifier devices.

Each wiring may be provided in a straight line on each of the first surface and the second surface.

Each wiring may have a connecting-direction extending portion on each of the first surface and the second surface, where the connecting-direction extending portion extends along a current path of the plurality of switching devices cascade-connected on the first surface or the plurality of rectifier devices cascade-connected on the second surface. At least one capacitor may be provided in the connecting-direction extending portion.

At least one capacitor may include a plurality of capacitors provided in series in the wiring and positioned on the first surface and the second surface.

A capacitor positioned on the first surface and a capacitor positioned on the second surface, which are included in the plurality of capacitors, may be positioned offset from each other in a planar view.

Each switching device and each rectifier device may be positioned offset from each other in a planar view.

The flying capacitor circuit may further include a heat sink provided at at least one of a position facing each capacitor across the substrate, a position facing each switching device across the substrate and a position facing each rectifier device across the substrate.

Each rectifier device may be a switching device.

The flying capacitor circuit may be an inverter. An output terminal may be provided at a midpoint of a wiring connecting a main terminal of the plurality of cascade-connected switching devices which is the closest to one end and a main terminal of the plurality of cascade-connected rectifier devices which is the closest to the one end. A main terminal of the plurality of cascade-connected switching devices which is the closest to the other end and a main terminal of the plurality of cascade-connected rectifier devices which is the closest to the other end may be input terminals for direct current power.

The flying capacitor circuit may include a plurality of first drive circuits, positioned on the first surface, for individually driving the plurality of switching devices. The flying capacitor circuit may include a plurality of second drive circuits, positioned on the second surface, for individually driving the plurality of rectifier devices each being a switching device. Each of the first drive circuits and each of the second drive circuits may be positioned offset from each other in a planar view.

Each of the rectifier devices may be a diode.

In the second aspect of the present invention, a circuit module is provided. The circuit module may include a switching device mounted on a first surface of a substrate. The circuit module may include a rectifier device mounted on a second surface of the substrate. The circuit module may include at least one capacitor provided in a wiring for connecting a main terminal of the switching device and a main terminal of the rectifier device. At least part of the wiring may run sandwiching the substrate in parallel.

The circuit module may include a first connection terminal connected to a first main terminal of the switching device and a second connection terminal connected to a first main terminal of the rectifier device at one end portion, where the first main terminal is the main terminal. The circuit module may include a third connection terminal connected to a second main terminal of the switching device and a fourth connection terminal connected to a second main terminal of the rectifier device at another end portion, where the second main terminal is the main terminal.

In the third aspect of the present invention, a flying capacitor circuit is provided. The flying capacitor circuit may include a plurality of circuit modules cascade-connected therein, where each circuit module is the circuit module according to the second aspect.

In the fourth aspect of the present invention, a power conversion apparatus is provided. The power conversion apparatus may include a flying capacitor circuit according to the first aspect or the third aspect. The power conversion apparatus may include a direct current power source for supplying direct current power to the flying capacitor circuit.

The summary clause does not necessarily describe all necessary features of the embodiments of the present invention.

The present invention may also be a sub-combination of the features described above.

BRIEF DESCRIPTION OF THE DRAWINGS

FIG. 2 shows a relation between ON/OFF statuses of each switching device 21, 22 and an output voltage of a flying capacitor circuit 2.

DESCRIPTION OF EXEMPLARY EMBODIMENTS

While the present inventions are described through the embodiments, the embodiments below do not limit the inventions according to the scope of claims. In addition, not all the combination of the features explained in the embodiments are necessarily essential for the problems to be solved by the inventions.

[1. Configuration of Power Conversion Apparatus 1]

Figure 1:
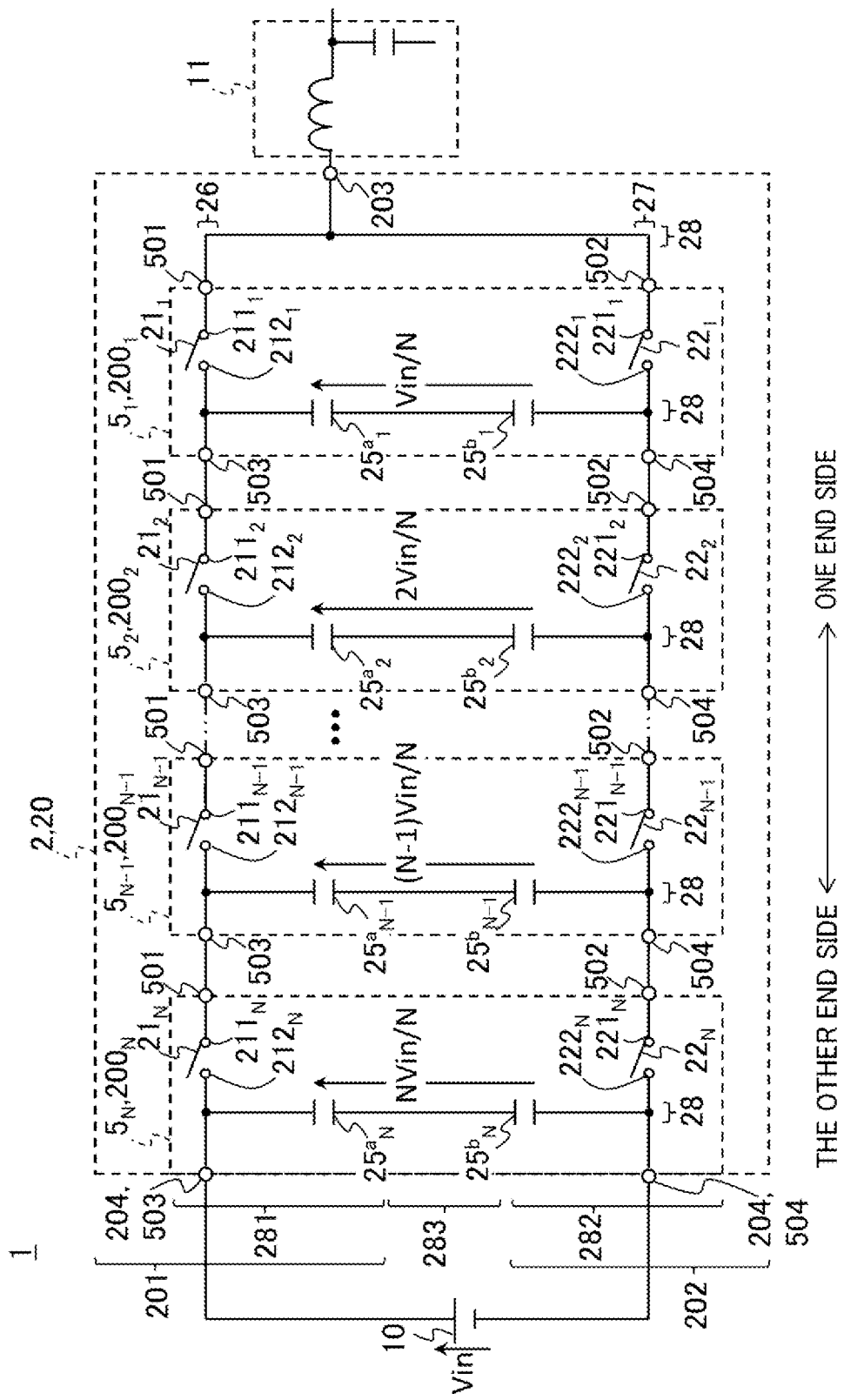
FIG. 1 shows a power conversion apparatus 1 according to the present embodiment.

FIG. 1 shows a power conversion apparatus 1 according to the present embodiment. The power conversion apparatus 1 has a direct current power source 10, a flying capacitor circuit 2 and an LC filter 11.

[1-1. Direct Current Power Source 10]

The direct current power source 10 supplies a direct current power Vin to the flying capacitor circuit 2. The direct current power source may be a rectifier circuit for rectifying alternate current supplied by a power system. For reference, one or more smoothing capacitors (now shown) for smoothing the direct current power Vin supplied by the direct current power source 10 may be provided between the direct current power source 10 and the flying capacitor circuit 2. If alternate current is output from the power conversion apparatus 1, two smoothing capacitors may be provided, and the midpoint between the two smoothing capacitors may be set as the return path of the alternate current.

[1-2. Flying Capacitor Circuit 2]

The flying capacitor circuit 2 may be a multi-level flying capacitor circuit for converting power through a flying capacitor method, and in this embodiment, as an example, the flying capacitor circuit 2 is an inverter for converting the direct current voltage from the direct current power source 10 into a multi-level voltage. The flying capacitor circuit 2 has a plurality of switching devices 21 provided on a substrate 20, a plurality of rectifier devices (in this embodiment, switching devices) 22, and at least one capacitor 25.

For reference, in FIG. 1, the flying capacitor circuit 2 is shown in three portions of the substrate 20, namely a portion on a first surface 201 side, a portion on a second surface 202 side and a portion between the first surface 201 and the second surface 202. Moreover, in this embodiment, the flying capacitor circuit 2 is an N+1 level (N represents an integer of 1 or more) flying capacitor circuit, and has N switching devices 21 (this is also referred to as the switching devices $21_1$ to $21_N$), N switching devices 22 (this is also referred to as the switching devices $22_1$ to $22_N$) and 2N capacitors 25 (this is also referred to as the capacitors $25^a_1$ to $25^a_N$, $25^b_1$ to $25^b_N$). Here, as an example, N may represent 3, 7 or 13, or may be another integer. The subscripts "1", ... "N" represent the device number, and superscripts "a", "b", etc., represent the identifier among the devices of the same number. In this embodiment, as an example, switching device $21_n$, $22_n$, and capacitor $25_n$ (n represents an integer where $1 \leq n \leq N$) that have the same device number may be associated with each other.

[1-2-1. Switching Device 21]

The switching devices $21_1$ to $21_N$ are cascade-connected on the first surface 201 of the substrate 20. In this embodiment, as an example, the switching device $21_1$, the switching device $21_2$, ... the switching device $21_N$ may be cascade-connected in this order from the one end side of the substrate 20 (the right side of the Figure) to the other end side. Each switching device 21 may be a surface mount component, and may have a main terminal 211 (this is also referred to as main terminals $211_1$ to $211_N$) on one end side of a connecting direction (the right side of the Figure), and a main terminal 212 (this is also referred to as main terminals $212_1$ to $212_N$) on the other end side of the connecting direction (the left side of the Figure). Each main terminal 211, 212 may be positioned on the first main surface 201. For reference, the main terminal may be an external terminal to which the main current flows. Each switching device 21 may further have a control terminal not shown in the Figure, and may be driven by control signals given to that control terminal.

The switching devices $21_1$ to $21_N$ may be connected to a first wiring 26 provided in a discontinuous manner, to perform switching between continuity and discontinuity on the first wiring 26.

The first wiring 26 may be provided on the first surface 201 of the substrate 20, or may be provided in the substrate 20.

[1-2-2. Switching Device 22]

The switching devices $22_1$ to $22_N$ are cascade-connected on the second surface 202 of the substrate 20. In this embodiment, as an example, the switching device $22_1$, the switching device $22_2$, . . . the switching device $22_N$ are cascade-connected in this order from the one end side (the right side of the Figure) to the other end side of the substrate 20. Each switching device 22 may be a surface mount component, and may have a main terminal 221 (this also may be referred to as main terminals $221_1$ to $221_N$) on the one end side of a connecting direction (the right side of the Figure), and a main terminal 222 (this also may be referred to as main terminals $222_1$ to $222_N$) on the other end side of the connecting direction (the left side of the Figure). Each main terminal 221, 222 may be positioned on the first main surface 202. Each switching device 22 may further have a control terminal not shown in the Figure, and may be driven by control signals given to that control terminal.

The switching devices $22_1$ to $22_N$ may be connected to a second wiring 27 provided in a discontinuous manner, to perform switching between continuity and discontinuity on the second wiring 27.

The second wiring 27 may be provided on the second surface 202 of the substrate 20, or may be provided in the substrate 20.

[1-2-3. Connection of Switching Devices 21, 22]

The switching devices $21_1$ to $21_N$ may be cascade-connected along a straight line and the switching devices $22_1$ to $22_N$ may be cascade-connected along a straight line parallel to the line along which the switching devices $21_1$ to $21_N$ are cascade-connected. The two straight lines may be the same straight line in a planar view. In this embodiment, as an example, the straight lines may extend between the one end side (the right side of the Figure) and the other end side (the left side of the Figure) of the substrate 20.

A main terminal $212_n$ (or the main terminals $211_n$) of the switching device $21_n$ and a main terminal $222_n$ (or the main terminal $221_n$) of the switching device $22_n$ may be connected by a single third wiring 28, where the switching device $21_n$ and the switching device $22_n$ are associated with each other and included in the plurality of switching devices 21, 22.

Moreover, the main terminal $211_1$ of the switching device $21_N$, which is the closest to the one end (the right side of the Figure) of the cascade connected switching devices $21_1$ to $21_N$, and the main terminal $221_1$ of the switching device $22_N$, which is the closest to the one end of the cascade-connected switching devices $22_1$ to $22_N$, may be connected by the third wiring 28. In this way, in this embodiment, as an example, a total of N+1 third wirings 28 may be provided in the flying capacitor circuit 2.

Each third wiring 28 is an example of the wirings, and at least part of the third wiring 28 runs sandwiching the substrate in parallel. For example, the third wiring 28 may have a first section 281 provided on the first surface 201 and a second section 282 provided on the second surface 202, and the first section 281 and the second section 282 may run sandwiching the substrate 20 in parallel for the entire sections of the first section 281 and the second section 282.

The wiring running sandwiching the substrate in parallel may mean that sections of the wiring at least partially overlap in a width direction in a planar view, or may mean that the sections of the wiring are positioned offset from each other by the thickness of the substrate 20 in a planar view. Being positioned offset from each other may mean being placed in a manner not to overlap with each other.

In this way, if at least part of the third wiring 28 runs sandwiching the substrate 20 in parallel, the associated sections running in parallel work differentially to cause magnetic fluxes to cancel each other, thereby decreasing a wiring inductance of the third wiring 28. As an example, the wiring inductance of the third wiring 28 may be reduced to $\frac{1}{10}$ to $\frac{1}{2}$ of the inductance of the third wirings 28 which does not run sandwiching the substrate 20 in parallel.

Each third wiring 28 may be provided in a straight line on each of the first surface 201 and the second surface 202. For example, the first section 281 and the second section 282 of each third wiring 28 may be provided in a straight line. The first section 281 may extend in a direction crossing the first wiring 26 (an orthogonally crossing direction, as an example), and the second section 282 may extend in a crossing direction crossing the second wiring 27 (an orthogonally crossing direction, as an example).

Each third wiring 28 may have a connecting portion 283 for connecting the first section 281 and the second section 282, the connection portion 283 extended between the first section 281 and the second section 282 in a thickness direction of the substrate 20. The connecting portion 283 may be a conductive through-via provided penetrating the substrate 20, as an example, or may be a copper wire, a copper inlay or a copper clip provided on a side portion of the substrate 20.

An output terminal 203 may be provided at the midpoint of the third wiring 28 of the plurality of third wirings 28 that connects the main terminal $211_1$ and the main terminal $221_1$ of the switching devices 21 and 22 which are the closest to the one end (the right hand side of the Figure) of the cascade-connected switching devices $21_1$ to $21_N$ and switching devices $22_1$ to $22_N$. Further, the main terminals $212_N$, $222_N$ of the switching devices $21_N$, $22_N$ which are the closest to the other end (the left side of the Figure) of the cascade-connected switching devices $21_1$ to $21_N$, $22_1$ to $22_N$ may each be an input terminal 204 of the direct current power Vin. In this embodiment, as an example, a positive terminal of the direct current power source 10 may be connected to the main terminal $212_N$, and a negative terminal of the direct current power source 10 may be connected to the main terminal $212_N$.

[1-2-3. Capacitor 25]

At least one capacitor 25 is provided in any of the third wirings 28. In this embodiment, as an example, at least one capacitor may be provided in each of the N third wirings 28 other than one of the complete N+1 third wirings 28 that is provided with the output terminal 203, namely the third wiring 28 connecting a main terminal $211_1$ of the switching device $21_1$ which is the closest to the one end (the right side of the Figure) of the switching devices $21_1$ to $21_N$, and a main terminal $221_1$ of the switching device $22_1$ which is the closest to the one end (the right side of the Figure) of the switching devices $22_1$ to $22_N$. In this way, energy can be surely transferred between the capacitors 25 by switching each switching device 21, 22 between continuity and discontinuity, thereby enabling power conversion. In each of the N third wirings 28 other than the third wiring 28 connecting the terminals $211_1$, $221_1$, a capacitor $25^a{}_n$ positioned on the first surface 201 and a capacitor $25^b{}_n$ positioned on the second surface 202 may be provided in series.

Each capacitor 25 may be a surface mount component, and may have terminals at the both end portions. Each capacitor 25 may be positioned along the third wiring 28 in which that capacitor 25 is provided.

Here, the capacitors $25^a$ (as an example, capacitor $25^a{}_N$, $25^a{}_{(N-1)}$) provided on two neighboring third wirings 28 in the connecting direction of the switching devices 21 on the first surface 201 may be physically positioned so as to sandwich the switching device 21 (as an example, the switching device $21_N$). Similarly, the capacitors $25^b$ (as an example, capacitor $25^b{}_N$, $25^b{}_{(N-1)}$) provided on two neighboring third wirings 28 in the connecting direction of the switching devices 22 on the second surface 202 may be physically positioned so as to sandwich the switching device 22 (as an example, the switching device $22_N$).

The capacitors $25^a{}_1$ to $25^a{}_N$, $25^b{}_1$ to $25^b{}_N$ may each work as a flying capacitor, and may maintain voltages which are different according to the number of the cascade-connected switching devices 21, 22 from the output terminal 203, in other words, the number of stages (in this embodiment, the device numbers, as an example). For example, capacitors $25^a{}_1$, $25^b{}_1$ may as a whole maintain a voltage of 1×Vin/N, capacitors $25^a{}_2$, $25^b{}_2$ may as a whole maintain a voltage of 2×Vin/N, and capacitors $25^a{}_n$, $25^b{}_n$ may as a whole maintain a voltage of n×Vin/N.

[1-2-4. Substrate 20]

The substrate 20 may be formed by connecting a plurality of substrates 200 (in this embodiment, as an example, N substrates $200_1$ to $200_N$) In this case, the flying capacitor circuit 2 may be formed by cascade-connecting a plurality of circuit modules 5 (in this embodiment, as an example, N circuit modules $5_1$ to $5_N$), each including the substrate 200.

[1-2-5. Circuit Module 5]

Each circuit modules $5_n$ (n represents any of the integers where 1≤n≤N) may include a switching device $21_n$ mounted on the first surface 201 of the substrate $200_n$, a switching device $22_n$ mounted on the second surface 202 of the substrate 200 and at least one capacitor $25_n$ (in this embodiment, as an example, two capacitors $25^a{}_n$, $25^b{}_n$) provided on the third wiring 28 connecting the main terminal $212_n$ of the switching device $21_n$ and the main terminal $222_n$ of the switching terminal $22_n$. At least part of the third wiring 28 may run sandwiching the substrate $200_n$ in parallel. Accordingly, the third wiring 28 runs sandwiching the substrate in parallel at least in part.

Moreover, each circuit module $5_n$ may include a first connection terminal 501 connected to the main terminal $211_n$ of the switching device $21_n$ and a second connection terminal 502 connected to the main terminal $221_n$ of the switching device $22_n$ at the one end portion (the end portion on the right side, in the Figure). Each circuit module $5_n$ may include a third connection terminal $503_n$ connected to the main terminal $212_n$ of the switching device $21_n$ and a fourth connection terminal 504 connected to the main terminal $222_n$ of the switching device $22_n$ at the other end portion (the end portion on the left side, in the Figure).

The first connection terminal 501 may be connected to the third connection terminal 503 of another circuit module 5, and the second connection terminal 502 may be connected to the fourth connection terminal 504 of another circuit module. In this way, the flying capacitor circuit 2 is formed of the plurality of connected circuit modules 5. Connection between the terminals, the first connection terminal 501 through the fourth connection terminal 504, may be established using copper wires or copper clips.

For reference, if the overlapping level of the sections of the third wiring 28 running sandwiching the substrate 200 in parallel in a planar view is different from one circuit module 5 to another, it is preferable, in forming the flying capacitor circuit 2, to use the circuit module 5 with a greater overlapping level of the third wiring 28 in a planar view at a position where a potential difference which may be generated between the main terminals 211, 221 and/or between the main terminals 212, 222 is larger. In this way, voltage overshoot generated by switching can surely be reduced.

[1-3. LC Filter 11]

An LC filter 11 is connected to the output terminal 203 of the flying capacitor circuit 2. The LC filter 11 may convert the multilevel output voltage output from the flying capacitor circuit 2 into a voltage of a sine wave, if the power conversion apparatus 1 outputs alternate current power. If the flying capacitor circuit 2 outputs direct current power, the LC filter may work as a low pass filter for removing high frequency noise.

According to the flying capacitor circuit as explained above, the third wiring 28 connecting the switching device 21 and the switching device 22 through the corresponding capacitor 25 runs sandwiching the substrate 20 in parallel at least in part, so that the respective sections running in parallel cause the magnetic fluxes to cancel each other. Therefore, the wiring inductance of the third wirings 28 can be reduced, and voltage overshoot generated by the switching of the switching devices 21, 22 can be reduced.

Furthermore, since each third wiring 28 is provided in a straight line on each of the first surface 201 and the second surface 202, the third wirings 28 can be set shorter compared to a case where the third wirings 28 are provided in a non-straight manner, thereby enabling the reduction of the wiring inductance. Accordingly, voltage overshoot generated to the third wiring 28 by switching can surely be reduced.

Moreover, since the capacitors 25 are provided in series in the third wiring 28, shorting of the flying capacitor circuit 2 can be prevented, even if one capacitor 25 on the third wiring 28 is broken.

Furthermore, since two capacitors 25 provided in series in the third wiring 28 are provided separately on the first surface 201 and on the second surface 202, sections of the third wiring 28 that are on the first surface 201 and on the second surface 202 can be aligned with each other, compared to a case where the capacitors 25 are provided only on one surface. Accordingly, the sections of the third wiring 28 running sandwiching the substrate 20 in parallel can be set longer, thus the wiring inductance of the third wiring 28 can surely be reduced, and the voltage overshoot can be surely reduced.

Moreover, since the switching devices $21_1$ to $22_N$ and the switching devices $22_1$ to $22_N$ are each cascade-connected in a straight line, the path of the main current can be set shorter and the wiring inductance of that path can be reduced, compared to a case where they are not cascade-connected in a straight line. Accordingly, voltage overshoot generated in the main current path by switching can surely be reduced.

Furthermore, since the switching devices $21_1$ to $21_N$ are cascade-connected in a straight line and the switching devices $22_1$ to $22_N$ are cascade-connected in a straight line parallel to the line in which the switching devices $21_1$ to $21_N$ are cascade-connected, the plurality of third wirings 28 can be set consistent in length. Accordingly, voltage overshoot generated in each third wiring 28 can surely be equally reduced.

Moreover, since the switching devices $21_1$ to $21_N$ are cascade-connected in the same straight line in the planar view as the line in which the switching devices $22_1$ to $22_N$ are cascade-connected, one of the end portions of the third wiring 28 that is of the first section 281 provided on the first surface 201 and the other end portion of the second section 282 provided on the second surface 202 can be aligned with each other while being located on the respective surfaces of the substrate 20. Accordingly, the sections running sandwiching the substrate 20 in parallel of the third wiring 28 can be set longer, thus the wiring inductance of the third wiring 28 can surely be reduced, and the voltage overshoot can be surely reduced.

In addition, according to the circuit module 5 as explained above, the third wirings connecting the switching devices 21 and their associated switching devices 22 through each capacitor 25 run sandwiching the substrate 20 in parallel at least in part, as such the corresponding sections running in parallel cancel magnetic fluxes with each other. Therefore, wiring inductance of the third wirings 28 can be reduced, and voltage overshoot generated by the switching can be reduced.

Moreover, since the first connection terminal 501 connected to the main terminal $211_n$ and the second connection terminal 502 connected to the main terminal $221_n$ are included in the one end portion and the third connection terminal 503 connected to the main terminal $212_n$ and the fourth connection terminal 504 connected to the main terminal $222_n$ are included in the other end portion, it is possible to form the flying capacitor circuit 2 having arbitrary levels, by connecting arbitrary number of the circuit modules 5.

[2. Behavior of Flying Capacitor Circuit 2]

FIG. 2 shows a relation between ON/OFF statuses of each switching device 21, 22 and an output voltage of a flying capacitor circuit 2. The flying capacitor circuit 2 may, as shown in this Figure, generate and output voltage of direct current voltage Vin to voltage in N+1 level, by controlling ON/OFF of the switching devices 21, 22. The voltage output may be, as an example, Vin/2 (=N·Vin/2N), (N−2)·Vin/2N, (n−4)·Vin/2N, (N−6)·Vin/2N, −Vin/2 (=(N−2N)·Vin/2N).

[2-1. Current Paths in the Flying Capacitor Circuit 2]

Figure 3:
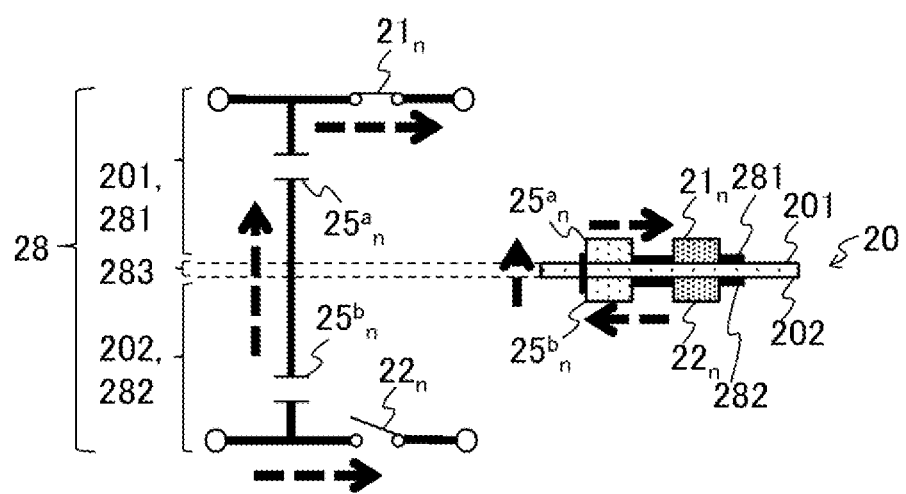
FIG. 3 shows a current path running the third wiring 28.

FIG. 3 shows a current path running the third wiring 28. Broken arrows in the Figure indicate the flows of the current. Moreover, in the left side of the Figure, the current paths are shown in three sections of the substrate 20, namely, the part of the first surface 201, the part of the second surface 202 and the intermediate part between the first surface 201 and the second surface 202; and the right side of the Figure shows the current paths viewed from a side of the flying capacitor 2.

In the flying capacitor circuit 2 according to this embodiment, the third wiring 28 provided with capacitors 25 run sandwiching the substrate 20 in parallel at least in part. Accordingly, if the current flows in the third wiring 28 as shown in the left side of the Figure, associated sections running in parallel differentially work in order to cancel magnetic fluxes with each other. In this way, inductance of the third wiring 28 becomes smaller.

For reference, in the above embodiment, it is explained that each third wiring 28 runs sandwiching the substrate 20 in parallel at least in part, however, the third wiring 28 on which the output terminal 203 is provided may not run sandwiching the substrate 20 in parallel.

3. Modification Example

Figure 4:
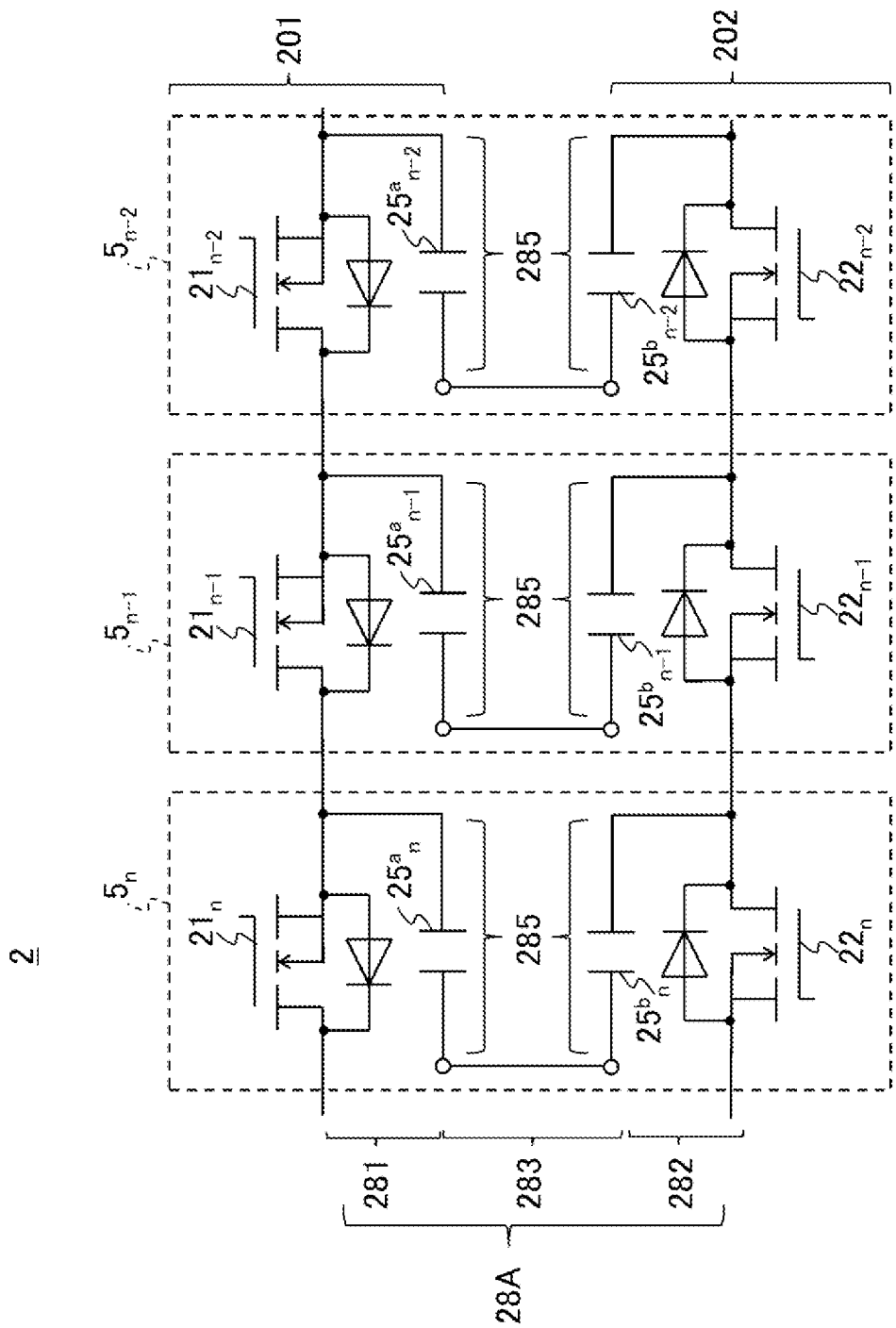
FIG. 4 shows the flying capacitor circuit 2 according to a modification example.
Figure 5:
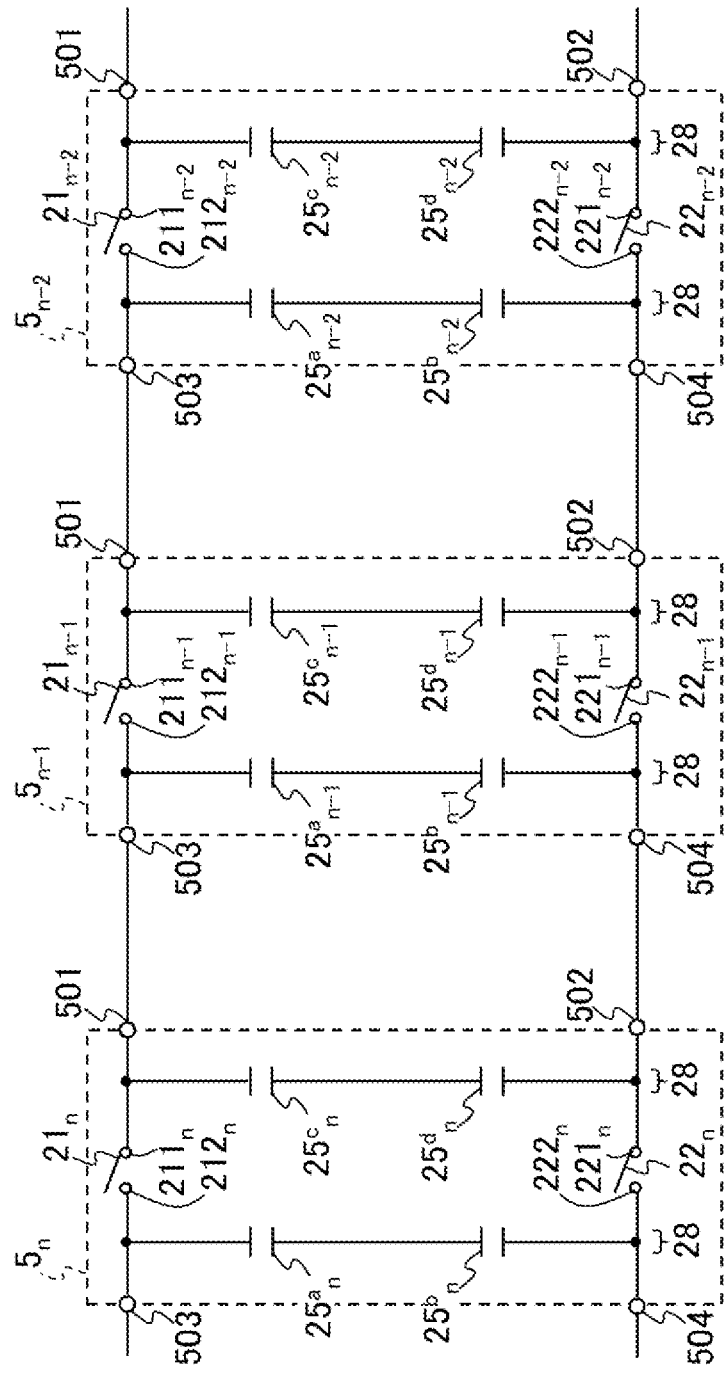
FIG. 5 shows the flying capacitor circuit 2 according to the modification example.

FIG. 4 shows the flying capacitor circuit 2 according to a modification example.

The flying capacitor circuit 2 may have a third wiring 28A. Each third wiring may have a connecting-direction extending portion on each of the first surface 201 and the second surface 202, the connecting-direction extending portion 285 extending along a current path of the plurality of switching devices $21_1$ to $21_N$ cascade-connected on the first surface 201 or the plurality of switching devices $22_1$ to $22_N$ cascade-connected on the second surface 202. The first section 281 and the second section 282 of each of the third wirings 28A may be provided to be bent on each of the first surface 201 and the second surface 202, and may include the connecting-direction extending portion 285 extending in a direction away from the current path of the switching devices $21_1$ to $21_N$ or the switching devices $22_1$ to $22_N$. The connecting-direction extending portion 285 may extend from the side of the main terminal $211_n$ (or $221_n$) being the object to be connected with the third wiring 28A toward the side of the main terminal $211_n$ (or $221_n$) on the other side. The connecting-direction extending portion 285 may not necessarily be parallel to the current path of the switching devices $21_1$ to $21_N$ or the switching devices $22_1$ to $22_N$.

Each capacitor 25 may be provided on the connecting-direction extending portion 285. In this embodiment, as an example, each capacitor $25_n$ may be positioned along the switching device $21_n$ or the switching device $22_n$. If three or more capacitors are provided on the third wiring 28A, one or more capacitors 25 may be provided on a single connecting-direction extending portion 285 each provided on the first section 281 and the second section 282 of the third wiring 28A. Instead of this, a plurality of connecting-direction extending portions 285 may be provided on the first section 281 and/or the second section 282, and the capacitors 25 may be provided on each of the connecting-direction extending portion 285. For example, if a plurality of connecting-direction extending portions 285 is provided on the first section 281, that first section 281 may be provided in a zig-zag shape within the first surface 201. For reference, the third wiring 28 provided with the output terminal 203 (as an example, the third wiring 28 connecting the main terminal $211_1$ to the connection terminal $221_1$) may not include the connecting-direction extending portion 285.

Each third wiring 28A may include a through-via as the connecting portion 283. The through-via may be provided on the end portion of the connecting-direction extending portion 285, each on the first surface 201 and the second surface 202, to connect the connecting-direction extending portions 285 with each other.

The flying capacitor circuit 2 may include a MOSFET as the switching devices 21, 22. The switching devices 21, 22 may be cascade-connected in a reverse direction with each other. In this embodiment, as an example, each switching device 21 has a source terminal on the output terminal 203 side and a drain terminal on the input terminal 204 side, and each switching device 22 has a drain terminal on the output terminal 203 side and a source terminal on the input terminal 204 side. To each switching device 21, 22, a wheeling diode may be connected in an inverse-parallel manner. The wheeling diode may be a parasitic diode of each switching device 21, 23 being the MOSFET. For reference, the switching devices 21, 22 are not limited to MOSFET, rather, they may be other switching devices like IGBT.

According to the flying capacitor circuit 2 as explained above, each third wiring 28 includes the connecting-direction extending portion 285 extending along the connecting direction of the device, and the capacitor 25 is provided on the connecting-direction extending portion 285. Accordingly, the capacitor 25 may be eliminated from the section between the cascade-connected switching devices 21 and between the cascade-connected switching devices 22 to physically position them, therefore intervals between the switching devices 21 and between the switching devices 22 can be shortened to accordingly downsize the flying capacitor circuit 2.

FIG. 4 shows the flying capacitor circuit 2 according to a modification example. In the flying capacitor circuit 2, a third wiring 28 may be included between the main terminal $212_n$ of the switching device $21_n$ and the main terminal $222_n$ of the associated switching device $22_n$, and another third wiring 28 may be included between the main terminal $211_n$ of the switching device $21_n$ and the main terminal $221_n$ of the associated switching device $22_n$, and a capacitor 25 may be provided in each third wiring 28. In this way, a pair of switching devices $21_n$, $22_n$ and another neighboring pair of switching devices $21_{n+1}$, $22_{n+1}$ are arranged in parallel, therefore the electric capacity between the switching device 21 and the switching device 22 can be increased.

Figure 6:
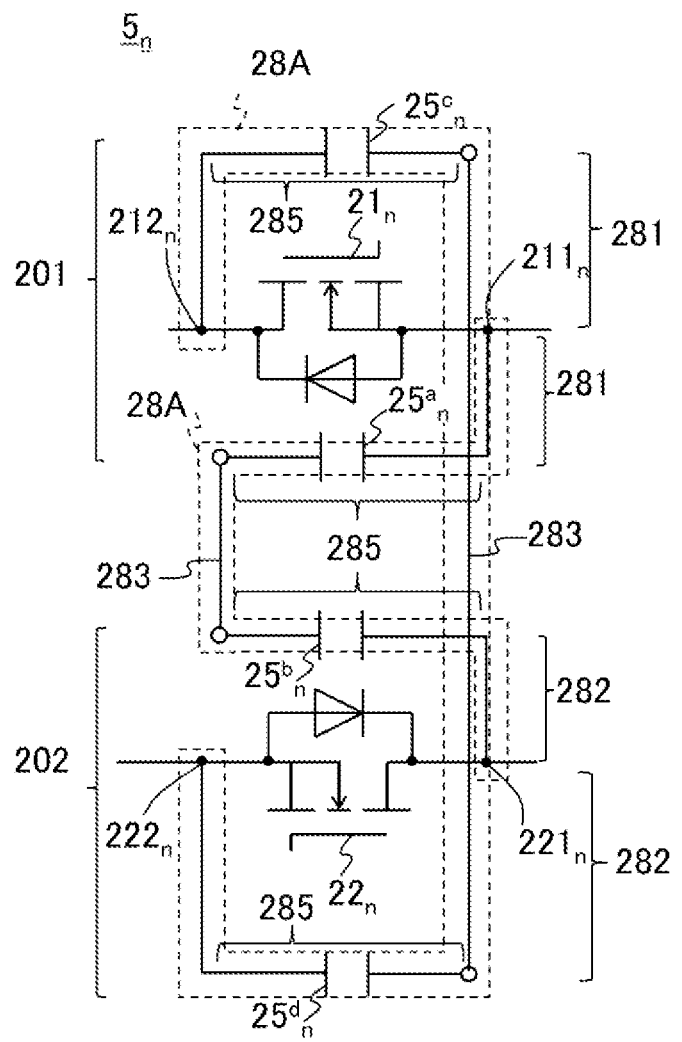
FIG. 6 shows a circuit module 5 according to the modification example.

FIG. 6 shows a circuit module 5 according to the modification example. In each circuit module $5_n$, a third wiring 28A may be included between the main terminal $212_n$ of the switching device $21_n$ and the main terminal $222_n$ of the associated switching device $22_n$, and another third wiring 28A may be included between the main terminal $211_n$ of the switching device $21_n$ and the main terminal $221_n$ of the associated switching device $22_n$.

The third wiring 28A connecting the main terminal $212_n$ and the main terminal $222_n$ and the other third wiring 28A connecting the main terminal $211_n$ and the main terminal $221_n$ may be provided on the opposite sides of the switching device $21_n$ or the switching device $22_n$ on each of the first surface 201 and the second surface 202.

The capacitor $25_n$ provided on the third wiring 28A connecting the main terminal $212_n$ and the main terminal $222_n$ and the capacitor $25_n$ provided on the third wiring 28A connecting the main terminal $211_n$ and the main terminal $221_n$ may each be positioned on the connecting-direction extending portion 285 in a manner sandwiching the switching device $21_n$ or the switching device $22_n$ therebetween in a crossing direction (in this embodiment, as an example, an orthogonally crossing direction) of the current paths of the switching devices $21_1$ to $21_N$ and the switching devices $22_1$ to $22_N$ on each of the first surface 201 and the second surface 202.

Figure 7:
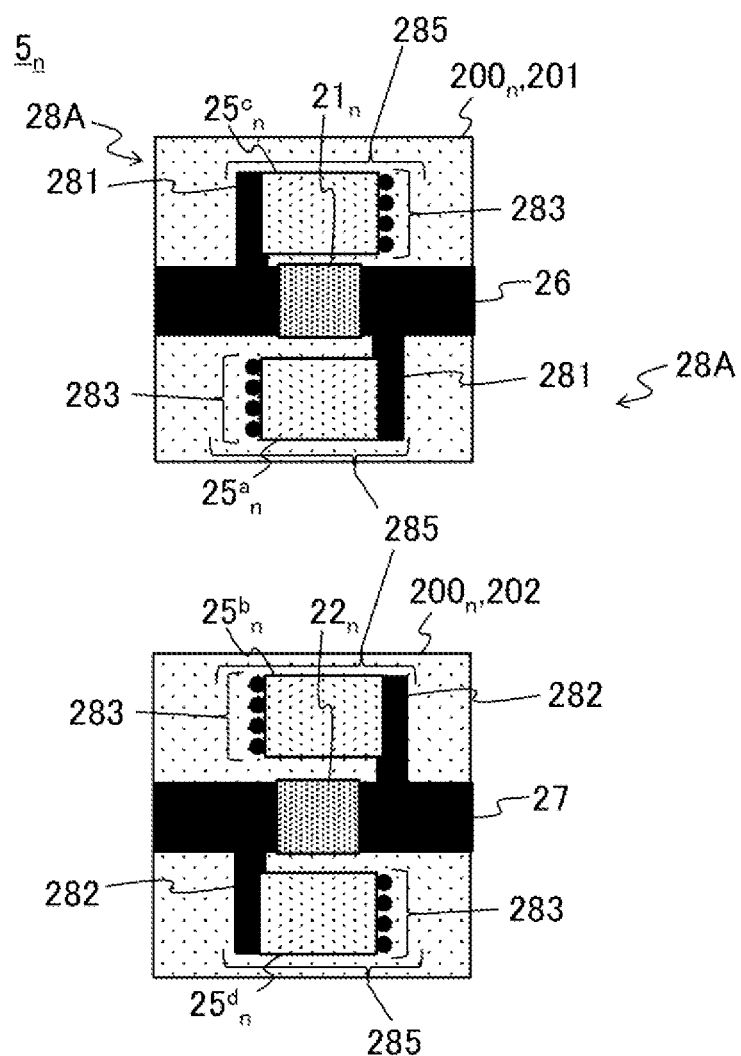
FIG. 7 shows an appearance of the circuit module 5 in FIG. 6.

FIG. 7 shows an appearance of the circuit module 5 in FIG. 6. For reference, the upper part of the Figure shows an appearance of the first surface 201, and the lower part shows an appearance of the second surface 202. Each capacitor 25 may have a terminal at both end portions, and may be positioned along the connecting-direction extending portion 285. At the end portion of the connecting-direction extending portion 285, a through-via as the connecting portion 283 may be provided for connecting the connecting-direction extending portions 285 of the first surface 201 and the second surface 202.

Figure 8:
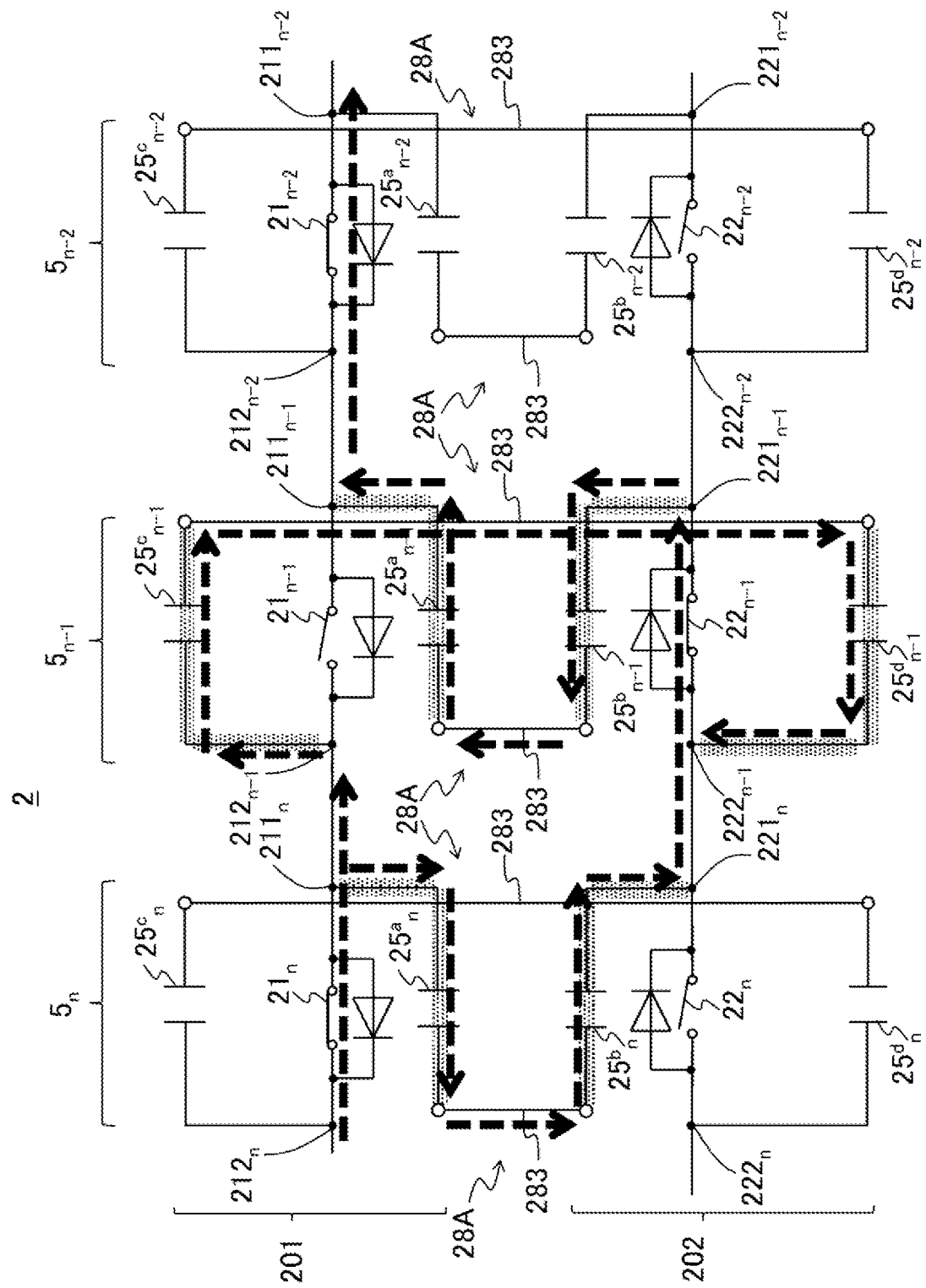
FIG. 8 shows the current path running the third wiring 28 in the flying capacitor circuit 2 to which the circuit module 5 in FIG. 6 is cascade-connected.

FIG. 8 shows the current path running the third wiring 28 in the flying capacitor circuit 2 to which the circuit module 5 in FIG. 6A is cascade-connected. For reference, in this Figure, illustration of the switching devices 21, 22 are simplified. Also, the current path when the switching devices $21_n$, $22_{n-1}$, $21_{n-2}$ are in the ON-state and the switching devices $22_n$, $21_{n-1}$, $22_{n-2}$ are in the OFF-state is shown.

In this modification example, as indicated by shading in the Figure, magnetic fluxes are cancelled in each of the sections running in parallel to each other in the third wiring 28A connecting the main terminal $211_n$ and the main terminal $221_n$ and in the third wiring 28A connecting the main terminal $211_{n-1}$ and the main terminal $221_{n-1}$ are cancelled, as a result, the wiring inductance of each third wiring 28A becomes smaller.

Figure 9:
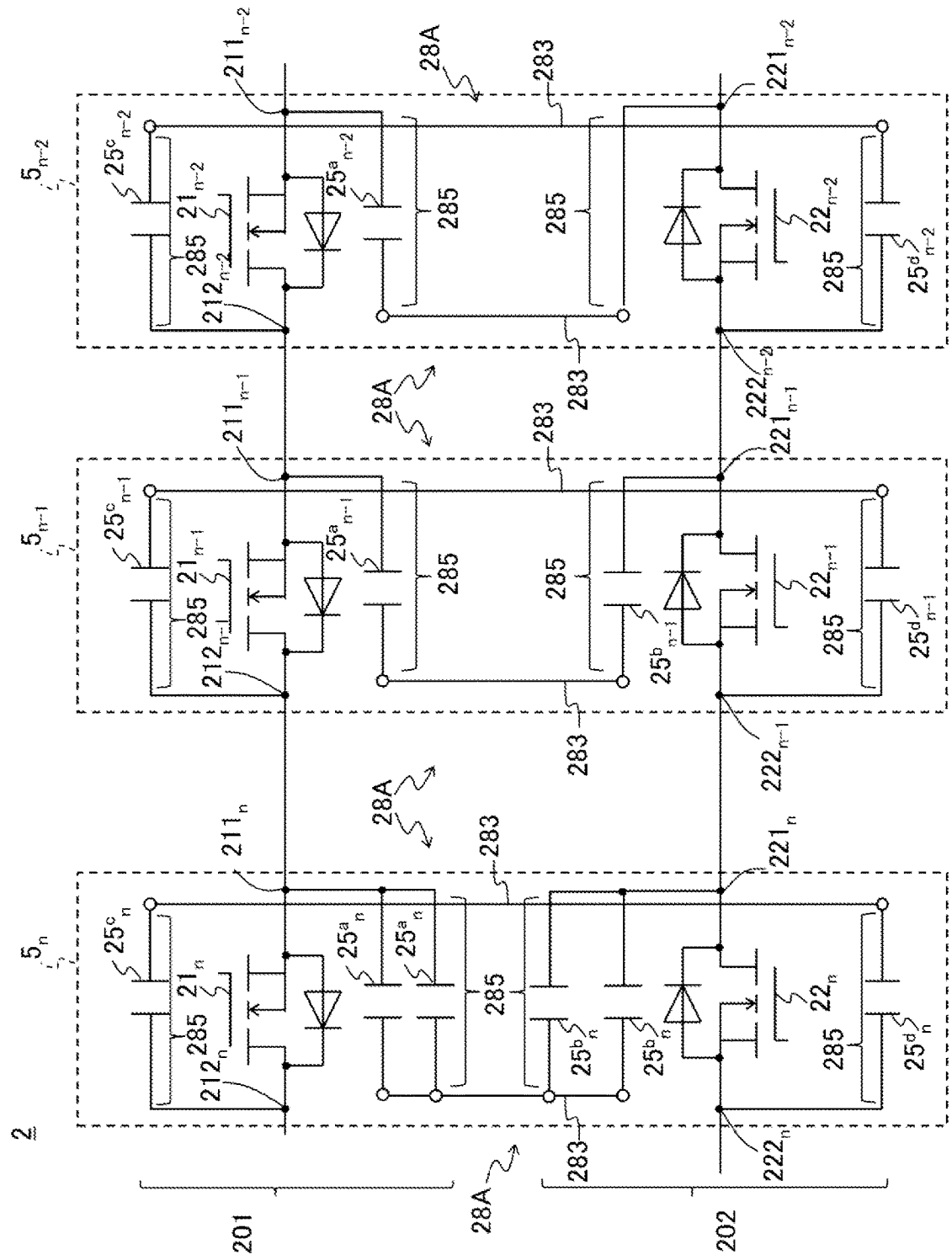
FIG. 9 shows the flying capacitor circuit 2 according to the modification example.

FIG. 9 shows the flying capacitor circuit 2 according to the modification example. In the flying capacitor circuit 2 according to this modification example, the number of capacitors 25 provided between the main terminals $211_n$, $221_n$ and/or between the main terminals $212_n$, $222_n$ of a set of associated switching devices $21_n$, $22_n$ may be different from the number of capacitors 25 provided between the main terminals $211_m$, $221_m$ and/or between the main terminals $212_m$, $222_m$ of another set of associated switching devices $21_m$, $22_m$ (here, m represents an integer where m≠n, 1≤m≤N). For example, the number of capacitors 25 provided between the main terminals 211, 221 and/or the main terminals 212, 222 on the input terminal 204 side may be different from the number of capacitors 25 provided between the main terminals 211, 221 and/or the main terminals 212, 222 on the input terminal 203 side. More concretely, greater number of capacitors 25 may be provided in series and/or in parallel between the main terminals 211, 221 and/or between the main terminals 212, 222, in which greater potential difference may be generated, than the number of capacitors 25 provided between the main terminals 211, 212 and/or the main terminals 212, 222, in which smaller potential difference may be generated. In this embodiment, as an example, the number of capacitors 25 provided in series and in parallel between the main terminals 211, 221 on the input terminal 204 side is greater than the number of capacitors 25 provided in series and in parallel between the main terminals 211, 221 on the output terminal 203. For example, while four capacitors 25 are provided between the main terminal $211_n$, $221_n$, only one capacitor 25 is provided between the main terminals $211_{n-2}$, $221_{n-2}$. It is noted that the capacity of the capacitors 25 provided between the main terminals may be increased, instead of increasing the number of capacitors 25 connected in parallel between the main terminals $211_n$, $221_n$ (or main terminals $212_n$, $222_n$).

For reference, if the capacitors 25 are provided in parallel between the associated main terminals $211_n$, $221_n$ (or the main terminals $212_n$, $222_n$), a plurality of third wirings 28A or the connecting-direction extending portions 285 may be provided in parallel between the corresponding main terminals.

According to the flying capacitor circuit 2 according to this modification example, the number of capacitors 25 provided between the main terminals $211_n$, $221_n$ and/or the main terminals $212_n$, $222_n$ is different from the number of capacitors 25 provided between the main terminals $211_m$, $221_m$ and/or the main terminals $212_m$, $222_m$. Therefore, if the numbers of capacitors 25 connected in series are different, voltage applied to individual capacitors 25 can be reduced between the main terminals having greater number of capacitors 25, as such breakdown of a capacitor 25 due to application of voltage can be prevented. Moreover, if the number of capacitors connected in parallel are different, the capacity may be set greater between the main terminals having greater number of capacitors 25 to thereby increase the energy amount to be transferred between other capacitors 25.

Furthermore, since the number of capacitors 25 on the input terminal 204 side is different from that on the output terminal 203 side, breakdown of the capacitors 25 due to application of voltage can be surely prevented by means of increasing the number of capacitors 25 connected in series on either of the input terminal 204 side or the output terminal 203 side, further, the capacity can be increased by increasing the number of capacitors 25 connected in parallel to thereby effectively increase the energy amount transferred to or from other capacitors 25.

For reference, in this modification example, it is explained that the third wiring 28A having the connecting-direction extending portion 285 is provided between the main terminals of switching devices 21, 22, however, it is also possible that the third wiring 28 not having the connecting-direction extending portion 285.

Figure 10:
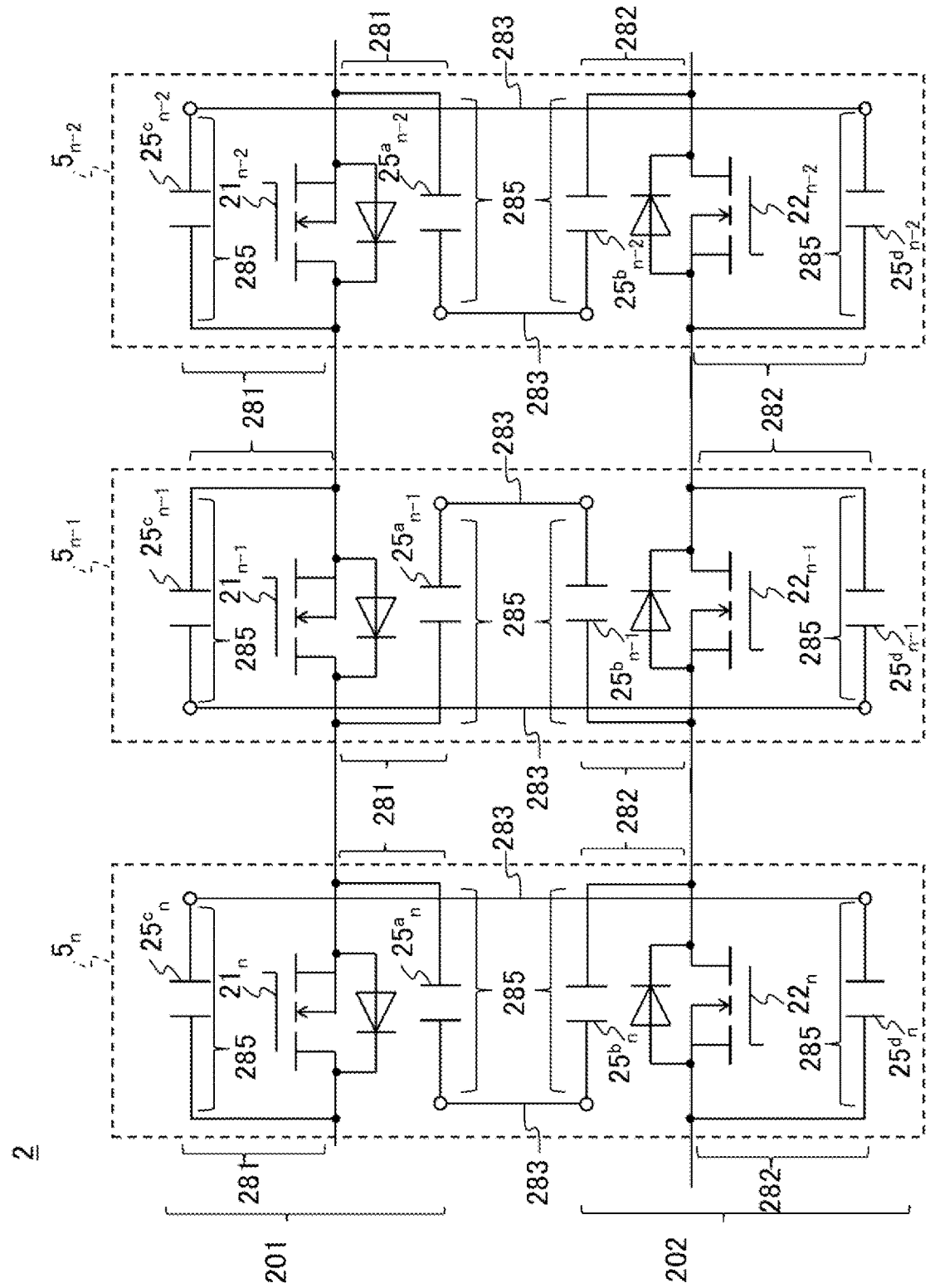
FIG. 10 shows the flying capacitor circuit 2 according to the modification example.

FIG. 10 shows the flying capacitor circuit 2 according to the modification example. The flying capacitor circuit 2 according to this modification example may be formed cascade-connecting the circuit module 5 in FIG. 6, similarly to the flying capacitor circuit 2 shown in FIG. 8. It is noted that, in the flying capacitor circuit 2 according to this modification example, the circuit module 5 in the center of the Figure is connected in a reverse direction. In this case, too, power conversion can be surely done by the flying capacitor circuit 2.

Figure 11:
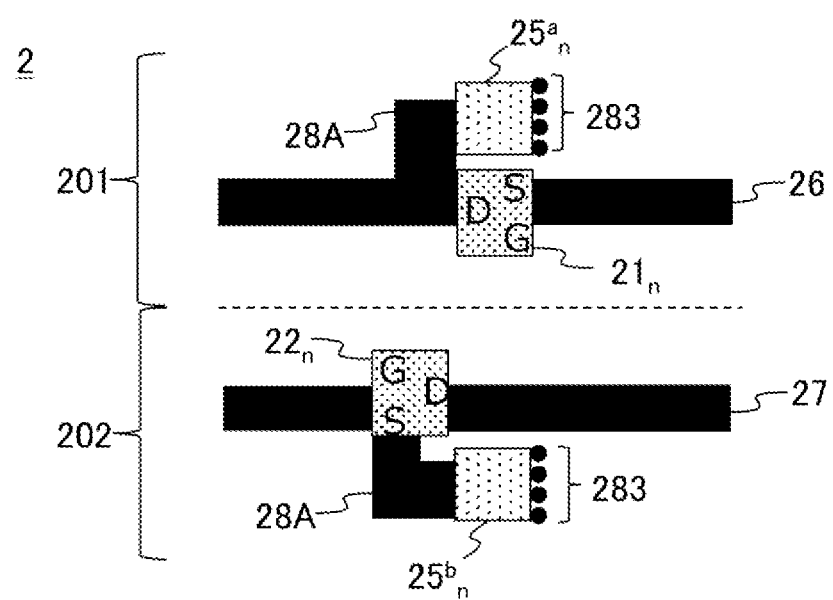
FIG. 11 shows the modification example of arrangement positions of the switching devices 21, 22.

FIG. 11 shows the modification example of arrangement position of the switching devices 21, 22. In this modification example, each switching device 21 and its associated switching device 22 are position offset in a planar view. For example, the switching device $21_n$ and the switching device $22_n$ in each associated pair may be positioned offset from each other in a planar view. In this modification example, the switching devices 21, 22 are offset in a cascade-connected direction, as an example. In this way, heat generated from each switching device 21, 22 can be dissipated from the surface of the reverse side of the switching devices 21, 22, the switching devices 21, 22 sandwiching the substrate 20.

Similarly, although not shown in the Figure, the capacitor $25^a$ positioned on the first surface 201 and its associated capacitor $25^b$ positioned on the second surface 202, among a plurality of capacitors 25, may be positioned offset from each other in a planar view. For example, if two capacitors $25^a$, $25^b$ are provided in series respectively on the first surface 201, the second surface 202 in the third wiring 28, these capacitors $25^a$, $25^b$ may be positioned offset from each other in a planar view. In this modification example, the capacitors $25^a$, $25^b$ may be offset along the third wiring 28. In this way, heat generated from each capacitor 25 can be dissipated from the surface of the reverse side of the capacitors 25, the capacitors 25 sandwiching the substrate 20.

Figure 12:
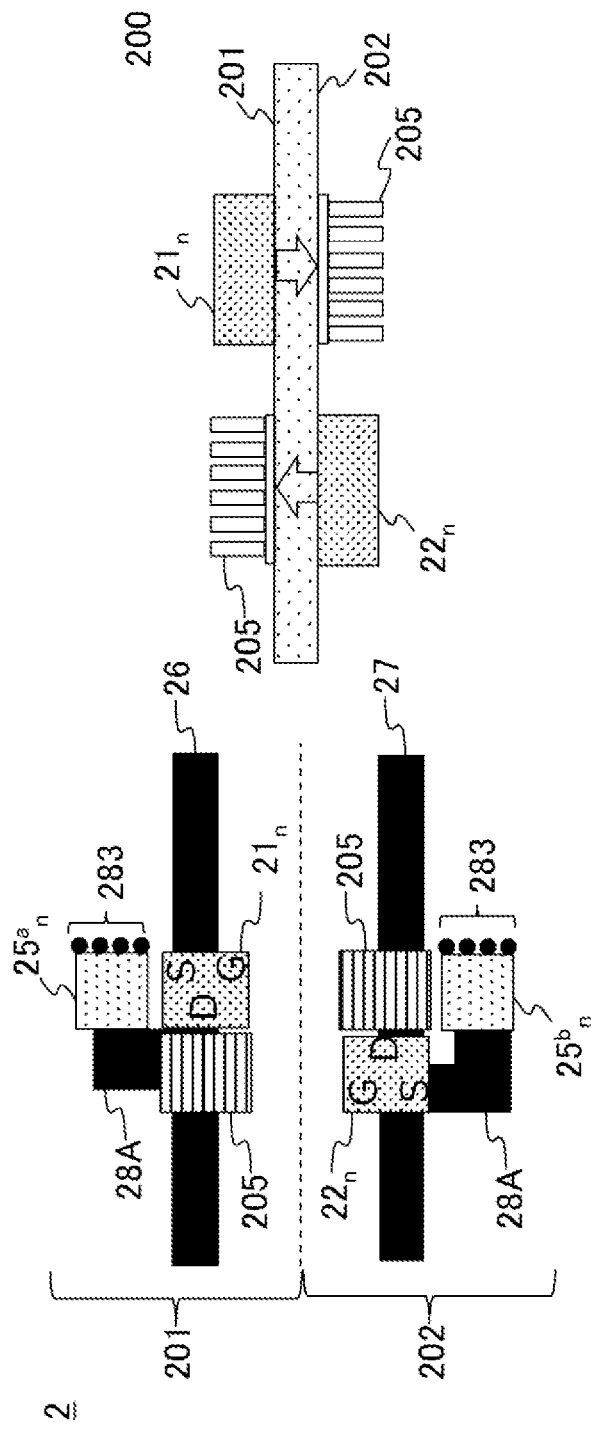
FIG. 12 shows the flying capacitor circuit 2 according to the modification example.

FIG. 12 indicates a flying capacitor circuit 2 according to a modification example. For reference, the left part of the Figure shows the flying capacitor circuit 2 viewed from the first surface 201 side and viewed from the second surface 202 side, and the right part of the Figure shows the flying capacitor circuit 2 viewed from a lateral side. Hollow arrows in the Figure indicate the flow of heat.

If the switching devices 21, 22 are positioned offset from each other in a planar view, a heat sink 205 may be provided at at least one of the position facing each switching device 21 across the substrate 20 and the position facing each switching device 22 across the substrate 20. In this way, as shown in the right part of the Figure, heat generated from the switching device 21 or the switching device 22 can be effectively dissipated. For reference, the heat sink 205 is a heat-dissipating fin of surface mount type, as an example. The heat sink 205 may be supplied with power, and may be solder-bonded to the first wiring 26 or to the second wiring 27. It is noted that the heat sink 205 may be a heat sink in other form, such as a metal plate, for example, an aluminum, an iron, or a copper.

Similarly, if the capacitor $25^a$ positioned on the first surface 201 and the capacitor $25^b$ positioned on the second surface 202 are positioned offset from each other in a planar view, a heat sink 205 may be provided at at least one of the positions facing the respective capacitors 25 across the substrate 20. In this way, heat generated from the capacitor 25 can be effectively dissipated.

Figure 13:
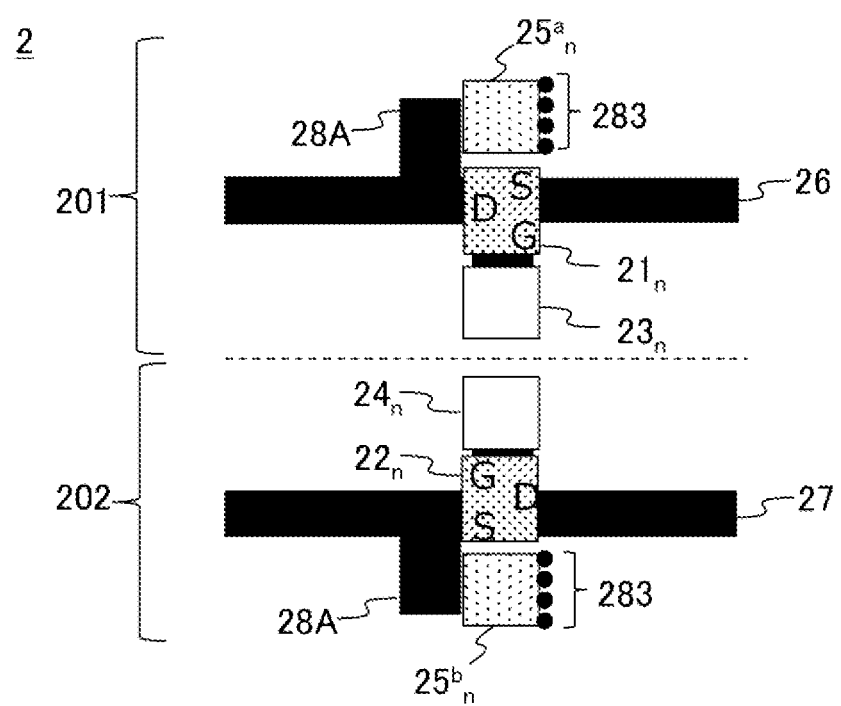
FIG. 13 shows the flying capacitor circuit 2 according to the modification example.

FIG. 13 indicates a flying capacitor circuit 2 according to a modification example. The flying capacitor circuit 2 may include a plurality of drive circuits 23 (this is also referred to as "drive circuit $23_1$ to $23_N$") for driving the switching devices $21_1$ to $21_N$, and a plurality of drive circuits 24 (this is also referred to as "drive circuits $24_1$ to $24_N$") for driving the switching devices $22_1$ to $22_N$. Each drive circuit $23_1$ to $23_N$, $24_1$ to $24_N$, may each be associated with the switching devices $21_1$ to $21_N$, $22_1$ to $22_N$ on one-on-one correspondence, and may supply control signals to the associated switching device 21 or the switching devices 22.

Among them, the drive circuits $23_1$ to $23_N$ are one of the examples of the first drive circuits, and may be positioned on the first surface 201. The drive circuit $23_1$ to $23_N$ may be positioned adjacent to the switching devices $21_1$ to $21_N$ to be driven. Similarly, the drive circuit $24_1$ to $24_N$ are one of the examples of the second drive circuits, and may be positioned on the second surface 202. The drive circuit $24_1$ to $24_N$ may be positioned adjacent to the switching devices $22_1$ to $22_N$ to be driven. For reference, the drive circuit 23 and the drive circuit 24 may each drive the switching devices 21, 22 at potentials which are different from each other, and their respective ground potentials may be different.

Figure 14:
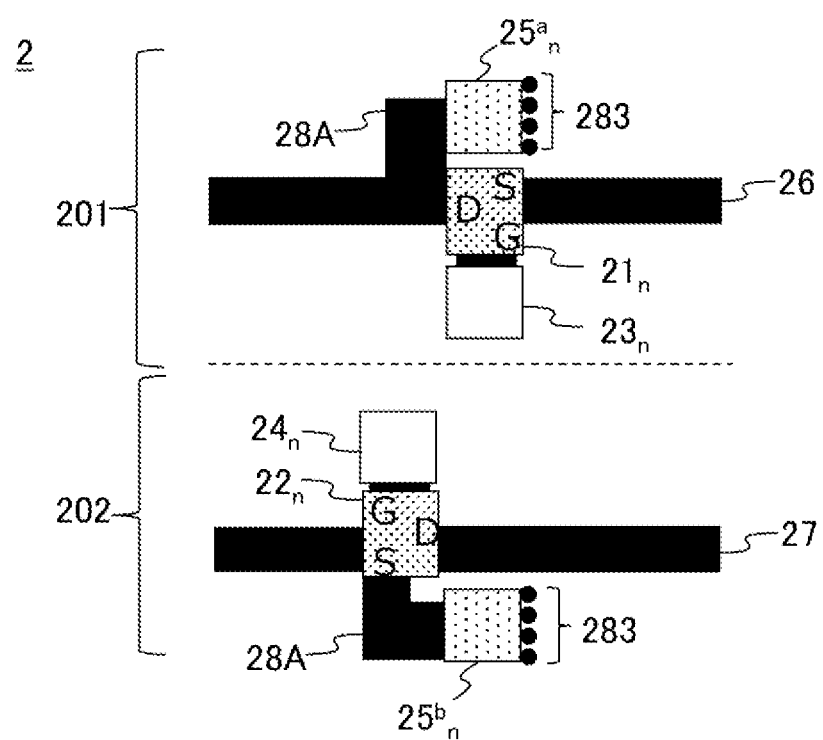
FIG. 14 shows the flying capacitor circuit 2 according to the modification example.

FIG. 14 shows the flying capacitor circuit 2 according to a modification example. The drive circuits $23_1$ to $23_N$ and the drive circuits $24_1$ to $24_N$ may be positioned offset with each other in a planar view. In this way, heat generated from the drive circuits 23, 24 can be dissipated from the surface of the reverse side of respective drive circuits 23, 24, sandwiching the substrate 20. Further, since the effect of noise generated by switching to the drive circuits 23, 24 on the surface of the reverse side through the substrate 20 sandwiched therebetween can be prevented, accordingly malfunction of the drive circuits 23, 24 can also be prevented.

For reference, the offset direction of the drive circuits 23, 24 may be a connecting direction of the switching device 21 or the switching device 22, or may be a crossing direction to that direction (as an example, an orthogonally crossing direction). Moreover, in this Figure, each switching device 21 end each switching device 22 are also positioned offset with each other in a planar view, however, a configuration may be possible where the switching devices 21, 22 are not offset but the drive circuits 23, 24 are offset. Further, the heat sink 25 may be provided at at least one of the position facing the drive circuit 23 across the substrate 20 and the position facing the drive circuit 24 across the substrate 20.

Figure 15:
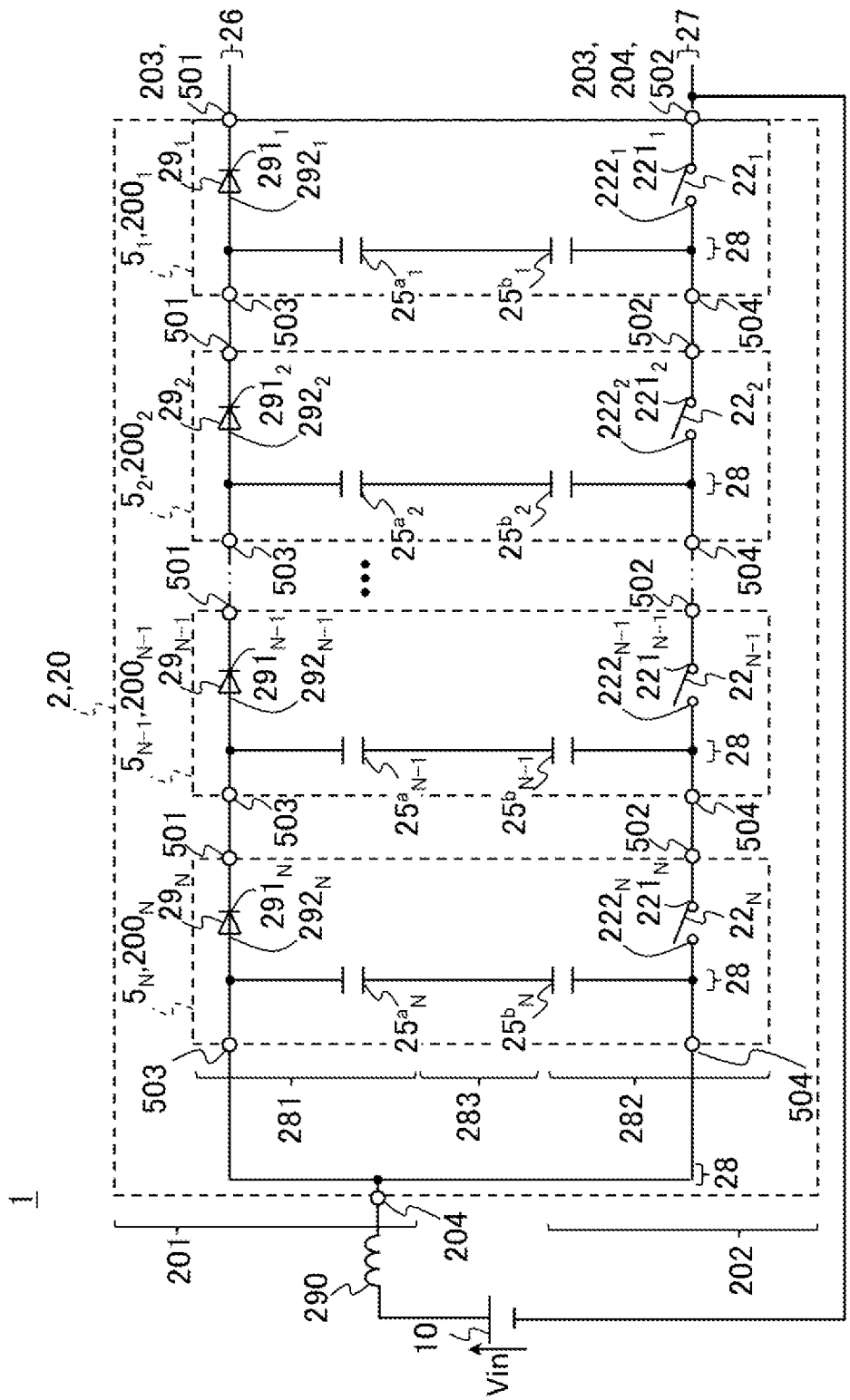
FIG. 15 shows a power conversion apparatus 1 according to the modification example.

FIG. 15 shows a power conversion apparatus 1 according to the modification example. The flying capacitor circuit 2 of this power conversion apparatus 1 may include a diode 29, as each rectifier device, instead of the switching device 21. As an example, the flying capacitor circuit 2 may include N diodes 29 (these are also referred to as "diodes $29_1$ to $29_N$"). Each diode 29 may be a surface mount component, and a cathode terminal 291 (this is also referred to as "cathode terminals $291_1$ to $291_N$") as the main terminal may be positioned and cascade-connected on the one end side (the right side of the Figure), and an anode terminal 292 (this is also referred to as "anode terminals 292₁ to 292_N") as the main terminal may be connected and cascade-connected on the other end side (the left side of the Figure).

In addition, in this modification example, the flying capacitor circuit 2 may be a boost chopper circuit. For example, the midpoint of the third wiring 28 connecting the main terminal 222_N of the cascade-connected switching devices 22₁ to 22_N which is the closest to the other end (the left side of the Figure) and the main terminal 211₁ of the cascade-connected switching devices 22₁ to 22_N which is the closest to one end (the right side of the Figure) may be the input terminal 204 of the direct-current power Vin. In addition, the main terminal 211₁ of the cascade-connected switching devices 22₁ to 22_N which is the closest to the one end (the right side of the Figure) and the cathode terminal 291₁ of the cascade-connected diode 29₁ to 29_N which is the closest to one end may be the output terminal 203 of the direct current power. The third wiring 28 to which the input terminal 204 is provided may not run sandwiching the substrate 20 in parallel.

The power conversion apparatus 1 may have an inductor 290 between the direct power source 10 and the flying capacitor circuit 2. In this embodiment, as an example, the inductor 290 is provided between the positive side terminal of the direct current power source 10 and the input terminal 204 on the positive side of the flying capacitor circuit 2, however, the inductor 290 may be provided between the negative side terminal of the direct current power source 10 and the input terminal 204 on the negative side of the flying capacitor circuit 2. The inductor 290 may accumulate energy by flowing current when any of the switching devices 22₁ to 22_N is ON, and may discharge energy when that switching device is OFF.

According to the flying capacitor 2 as explained above, since it includes a diode 29 as a rectifier device, the flying capacitor circuit 2 may be used as a chopper. For reference, the flying capacitor circuit 2 is explained as a boost chopper in this modification example, it may be a step-down chopper.

4. Other Modification Examples

For reference, in the above-explained embodiments and the modification example, it is explained that the flying capacitor circuit 2 is configured to be connected with a plurality of circuit modules, however, an integrate substrate 20 without using a circuit module 5 may be configured.

Moreover, it is explained that the power conversion apparatus 1 has only one flying capacitor circuit 2, however, the power conversion apparatus 1 may have a plurality of flying capacitor circuits 2 in parallel. The plurality of flying capacitor circuits 2 may be provided on the same substrate 20, or each of the flying capacitor circuits 2 may be provided on individual substrates 20. If each of the plurality of flying capacitor circuits 2 work as an inverter, the power conversion apparatus 1 as a whole may work as a single-phase inverter, or may work as a multiple-phase inverter, such as three-phase.

While the embodiments of the present invention have been described, the technical scope of the present invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams are not particularly expressed "before", "prior to" or the like, and can be performed in any order as long as it is not that the output from a previous process is used in a later process. Even if the process flow is described using phrases such as "first" or "next" in claims, description, or diagrams, it does not necessarily mean that the process must be performed in this order.

EXPLANATION OF REFERENCES

1 Power conversion apparatus; 2 Flying capacitor circuit; 5 Circuit module; 10 Direct current power source; 11 LC filter; 20 Substrate; 21 Switching device; 22 Switching device; 23 Drive circuit; 24 Drive circuit; 25 Capacitor; 26 First wiring; 27 Second wiring; 28 Third wiring; 29 Diode; 200 Substrate; 201 First surface; 202 Second surface; 203 Output terminal; 204 Input terminal; 205 Heat sink; 211 Main terminal; 281 First section; 282 Second section; 283 Connecting portion; 285 Connecting direction extending portion; 290 Inductor; 291 Cathode terminal; 292 Anode terminal; 501 First connection terminal; 502 Second connection terminal; 503 Third connection terminal; 504 Fourth connection terminal

What is claimed is:

1. A flying capacitor circuit comprising:
   a plurality of switching devices cascade-connected on a first surface of a substrate;
   a plurality of rectifier devices cascade-connected on a second surface of the substrate;
   at least one capacitor provided in a wiring connecting main terminals of a switching device and a rectifier device that are associated with each other and included in the plurality of switching devices and the plurality of rectifier devices, wherein the number of capacitors provided between main terminals of a switching device and a rectifier device of one set associated with each other is different from the number of capacitors provided between main terminals of a switching device and a rectifier device of another set, the switching device and the rectifier device of the one set and the switching device and the rectifier device of the other set being included in the plurality of switching devices and the plurality of rectifier devices; and
   at least part of a wiring run sandwiching the substrate in parallel.

2. The flying capacitor circuit according to claim 1, wherein the plurality of switching devices are cascade-connected in a straight line and the plurality of rectifier devices are cascade-connected in a straight line parallel to the line in which the plurality of switching devices are cascade-connected.

3. The flying capacitor circuit according to claim 1, wherein the plurality of switching devices are cascade-connected in a straight line and the plurality of rectifier devices are cascade-connected in a straight line which is the same straight line in a planar view as the line in which the switching devices are cascade-connected.

4. The flying capacitor circuit according to claim 1, wherein the at least one capacitor is included in each of a plurality of wirings except a wiring connecting a main terminal of the plurality of cascade-connected switching devices which is the closest to one end and a main terminal of the plurality of cascade-connected rectifier devices which is the closest to the one end, the plurality of wirings each connecting main terminals of a switching device and a rectifier device that are associated with each other and included in the plurality of switching devices and the plurality of rectifier devices.

5. The flying capacitor circuit according to claim 4, wherein the number of capacitors provided between main terminals of a switching device and a rectifier device on an input terminal side of the flying capacitor is different from the number of capacitors provided between main terminals of a switching device and a rectifier device on an output terminal side of the flying capacitor circuit, the switching device and the rectifier device on the input terminal side and the switching device and the rectifier device on the output terminal side being included in the plurality of switching devices and the plurality of rectifier devices.

6. The flying capacitor circuit according to claim 1, wherein each wiring is provided in a straight line on each of the first surface and the second surface.

7. The flying capacitor circuit according to claim 1, wherein:
each wiring has a connecting-direction extending portion on each of the first surface and the second surface, the connecting-direction extending portion extending along a current path of the plurality of switching devices cascade-connected on the first surface or the plurality of rectifier devices cascade-connected on the second surface; and
the at least one capacitor is provided in the connecting-direction extending portion.

8. The flying capacitor circuit according to claim 1, wherein the at least one capacitor includes a plurality of capacitors provided in series in the wiring and positioned on the first surface and the second surface.

9. The flying capacitor circuit according to claim 8, wherein a capacitor positioned on the first surface and a capacitor positioned on the second surface, which are included in the plurality of capacitors, are positioned offset from each other in a planar view.

10. The flying capacitor circuit according to claim 9, further comprising a heat sink provided at at least one of a position facing each capacitor across the substrate, a position facing each switching device across the substrate and a position facing each rectifier device across the substrate.

11. The flying capacitor circuit according to claim 1, wherein each switching device and each rectifier device are positioned offset from each other in a planar view.

12. The flying capacitor circuit according to claim 1, wherein
each rectifier device is a switching device.

13. The flying capacitor circuit according to claim 12, wherein
the flying capacitor circuit is an inverter;
an output terminal is provided at a midpoint of a wiring connecting a main terminal of the plurality of cascade-connected switching devices which is the closest to one end and a main terminal of the plurality of cascade-connected rectifier devices which is the closest to the one end; and
a main terminal of the plurality of cascade-connected switching devices which is the closest to the other end and a main terminal of the plurality of cascade-connected rectifier devices which is the closest to the other end are input terminals for direct current power.

14. The flying capacitor circuit according to claim 12, further comprising:
a plurality of first drive circuits, positioned on the first surface, for individually driving the plurality of switching devices; and
a plurality of second drive circuits, positioned on the second surface, for individually driving the plurality of rectifier devices each being a switching device; wherein
each of the first drive circuits and each of the second drive circuits are positioned offset from each other in a planar view.

15. The flying capacitor circuit according to claim 1, wherein each of the rectifier devices is a diode.

16. A power conversion apparatus comprising:
the flying capacitor circuit according to claim 1; and
a direct current power source for supplying direct current power to the flying capacitor circuit.

17. A circuit module comprising:
a switching device mounted on a first surface of a substrate;
a rectifier device mounted on a second surface of the substrate; and
at least one capacitor provided in a wiring for connecting a main terminal of the switching device and a main terminal of the rectifier device, wherein the number of capacitors provided between main terminals of a switching device and a rectifier device of one set associated with each other is different from the number of capacitors provided between main terminals of a switching device and a rectifier device of another set, the switching device and the rectifier device of the one set and the switching device and the rectifier device of the other set being included in the plurality of switching devices and the plurality of rectifier devices; and
at least part of a wiring run sandwiching the substrate in parallel.

18. The circuit module according to claim 17, comprising:
a first connection terminal connected to a first main terminal of the switching device and a second connection terminal connected to a first main terminal of the rectifier device at one end portion, the first main terminal being the main terminal; and
a third connection terminal connected to a second main terminal of the switching device and a fourth connection terminal connected to a second main terminal of the rectifier device at the other end portion, the second main terminal being the main terminal.

19. A flying capacitor circuit comprising a plurality of circuit modules cascade-connected therein, each of the plurality of circuit modules being the circuit module according to claim 18.

20. A circuit module comprising:
a single flying capacitor circuit comprising:
a switching device;
a first capacitor and a second capacitor connected in series; and
a rectifier device, wherein
the switching device is mounted on a first surface of a substrate;
the first capacitor is mounted on the first surface of the substrate, electrically connected to the switching device;
the rectifier device is mounted on a second surface of the substrate;
the second capacitor is mounted on the second surface of the substrate, electrically connected to the rectifier device; and
a plurality of vias electrically connect the first capacitor in series to the second capacitor, the plurality of vias passing through the substrate.

21. The circuit module of claim 20, wherein the switching device is a metal-oxide, field effect transistor.

22. The circuit module of claim 20, wherein the switching device is an insulated gate bipolar transistor.

23. The circuit module of claim 20, wherein the rectifier device is a diode.

\* \* \* \* \*